(12) United States Patent
Iwabuchi et al.

(10) Patent No.: US 8,571,344 B2
(45) Date of Patent: Oct. 29, 2013

(54) METHOD OF DETERMINING A FEATURE OF AN IMAGE USING AN AVERAGE OF HORIZONTAL AND VERTICAL GRADIENTS

(75) Inventors: Hiroshi Iwabuchi, Yokohama (JP);
Hiroaki Taniguchi, Yokohama (JP);
Atsushi Matsuzaka, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 822 days.

(21) Appl. No.: 12/712,035

(22) Filed: Feb. 24, 2010

(65) Prior Publication Data

US 2010/0220928 A1    Sep. 2, 2010

(30) Foreign Application Priority Data

Feb. 27, 2009    (JP) ................. 2009-046509

(51) Int. Cl.
*G06K 9/38*    (2006.01)
(52) U.S. Cl.
USPC ........................................................ 382/272
(58) Field of Classification Search
USPC ........................................................ 382/272
See application file for complete search history.

(56) References Cited

U.S. PATENT DOCUMENTS

| | | | | |
|---|---|---|---|---|
| 4,809,349 A | * | 2/1989 | Herby et al. | 382/270 |
| 5,253,192 A | * | 10/1993 | Tufts | 708/403 |
| 5,694,487 A | * | 12/1997 | Lee | 382/201 |
| 6,366,638 B1 | * | 4/2002 | Hsieh et al. | 378/19 |
| 7,822,231 B2 | * | 10/2010 | Coimbra et al. | 382/107 |
| 2005/0117785 A1 | * | 6/2005 | Boshra | 382/124 |
| 2006/0188013 A1 | * | 8/2006 | Coimbra et al. | 375/240.2 |

(Continued)

FOREIGN PATENT DOCUMENTS

| | | |
|---|---|---|
| JP | 2005-122607 A | 5/2005 |
| JP | 2008-250949 A | 10/2008 |

OTHER PUBLICATIONS

Miguel Tavares Coimbra and Michael Davies, "Approximating Optical Flow Within the MPEG-2 Compressed Domain", Jan. 2005, IEEE Transactions on Circuits and Systems for Video Technology, vol. 15, No. 1, p. 103-107.*

(Continued)

*Primary Examiner* — Gandhi Thirugnanam
(74) *Attorney, Agent, or Firm* — Arent Fox LLP

(57) ABSTRACT

An image processing method performed by a processor for processing a plurality of pixel values in an image data representing a two-dimensional image, the image processing method including defining a block representing a part of the two-dimensional image corresponding to a predetermined number of pixels in rows and columns, obtaining an average of a gradient of pixel value on the basis of the pixel values of adjacent pixels in the block along each of at least one of rows and at least one of columns, generating a product of the average of the gradient pixel value along each of at least one of the rows and the average of the gradient pixel value along each of at least one of the columns, and generating a double summation of the products of the gradient pixel values of each of the rows and the columns.

11 Claims, 21 Drawing Sheets

(56) References Cited

U.S. PATENT DOCUMENTS

| | | | |
|---|---|---|---|
| 2006/0280334 A1* | 12/2006 | Rav-Acha | 382/103 |
| 2008/0159630 A1* | 7/2008 | Sharon et al. | 382/199 |
| 2008/0159649 A1* | 7/2008 | Kempf et al. | 382/275 |
| 2009/0300692 A1* | 12/2009 | Mavlankar et al. | 725/94 |
| 2010/0119109 A1* | 5/2010 | Kim et al. | 382/103 |
| 2010/0220928 A1* | 9/2010 | Iwabuchi et al. | 382/190 |
| 2010/0231593 A1* | 9/2010 | Zhou et al. | 345/428 |
| 2010/0289878 A1* | 11/2010 | Sato et al. | 348/46 |
| 2010/0322476 A1* | 12/2010 | Kanhere et al. | 382/103 |
| 2012/0191287 A1* | 7/2012 | Shin et al. | 701/28 |

OTHER PUBLICATIONS

76.J. Shi and C. Tomasi, "Good features to track", Proc. IEEE Computer Society Conf. on Computer Vision and Pattern Recognition, pp. 593-600 1994.*

Bruce D. Lucas et al., "An Iterative Image Registration Technique with an Application to Stereo Vision", Proc $7^{th}$ Intl Joint Conf on Artificial Intelligence (IJCAI), Vancouver, British Columbia, pp. 674-679, Aug. 24-28, 1981.

Carlo Tomasi et al., "Detection and Tracking of Point Features", Technical Report CMU-CS-91-132, pp. 1-32, Apr. 1991.

* cited by examiner

FIG. 9

PIXEL VALUE

| 0 | 20 | 40 | 60 | 80 | 100 | 120 | 140 |
|---|----|----|----|----|-----|-----|-----|
| 0 | 20 | 40 | 60 | 80 | 100 | 120 | 140 |
| 0 | 20 | 40 | 60 | 80 | 100 | 120 | 140 |
| 0 | 20 | 40 | 60 | 80 | 100 | 120 | 140 |
| 0 | 20 | 40 | 60 | 80 | 100 | 120 | 140 |
| 0 | 20 | 40 | 60 | 80 | 100 | 120 | 140 |
| 0 | 20 | 40 | 60 | 80 | 100 | 120 | 140 |
| 0 | 20 | 40 | 60 | 80 | 100 | 120 | 140 |

21

HORIZONTAL DIRECTION GRADIENT

| 20 | 20 | 20 | 20 | 20 | 20 | 20 |
|----|----|----|----|----|----|----|
| 20 | 20 | 20 | 20 | 20 | 20 | 20 |
| 20 | 20 | 20 | 20 | 20 | 20 | 20 |
| 20 | 20 | 20 | 20 | 20 | 20 | 20 |
| 20 | 20 | 20 | 20 | 20 | 20 | 20 |
| 20 | 20 | 20 | 20 | 20 | 20 | 20 |
| 20 | 20 | 20 | 20 | 20 | 20 | 20 |
| 20 | 20 | 20 | 20 | 20 | 20 | 20 |

22

VERTICAL DIRECTION GRADIENT

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

23

PRODUCT OF HORIZONTAL DIRECTION GRADIENT AND VERTICAL DIRECTION GRADIENT

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

PIXEL VALUE (21)

|    | 0 | 40 | 60 | 40 | 0 | 60 | 100 |
|----|---|----|----|----|---|----|----|
| 60 | 60 | 100 | 120 | 100 | 60 | 120 | 160 |
| 40 | 40 | 80 | 100 | 80 | 40 | 100 | 140 |
| 20 | 20 | 60 | 80 | 60 | 20 | 80 | 120 |
| 0  | 0 | 40 | 60 | 40 | 0 | 60 | 100 |
| 40 | 40 | 80 | 100 | 80 | 40 | 100 | 140 |
| 100 | 100 | 140 | 160 | 140 | 100 | 160 | 200 |
| 80 | 80 | 120 | 140 | 120 | 80 | 140 | 180 |

HORIZONTAL DIRECTION GRADIENT (22)

| 0 | 40 | 20 | -20 | -40 | 60 | 40 |
|---|----|----|----|----|----|----|
| 0 | 40 | 20 | -20 | -40 | 60 | 40 |
| 0 | 40 | 20 | -20 | -40 | 60 | 40 |
| 0 | 40 | 20 | -20 | -40 | 60 | 40 |
| 0 | 40 | 20 | -20 | -40 | 60 | 40 |
| 0 | 40 | 20 | -20 | -40 | 60 | 40 |
| 0 | 40 | 20 | -20 | -40 | 60 | 40 |
| 0 | 40 | 20 | -20 | -40 | 60 | 40 |

VERTICAL DIRECTION GRADIENT (23)

| 60 | 60 | 60 | 60 | 60 | 60 | 60 |
|----|----|----|----|----|----|----|
| -20 | -20 | -20 | -20 | -20 | -20 | -20 |
| -20 | -20 | -20 | -20 | -20 | -20 | -20 |
| -20 | -20 | -20 | -20 | -20 | -20 | -20 |
| 40 | 40 | 40 | 40 | 40 | 40 | 40 |
| 60 | 60 | 60 | 60 | 60 | 60 | 60 |
| -20 | -20 | -20 | -20 | -20 | -20 | -20 |

PRODUCT OF HORIZONTAL DIRECTION GRADIENT AND VERTICAL DIRECTION GRADIENT (24)

| 0 | 2400 | 1200 | -1200 | -2400 | 3600 | 2400 |
|---|------|------|-------|-------|------|------|
| 0 | -800 | -400 | 400 | 800 | -1200 | -800 |
| 0 | -800 | -400 | 400 | 800 | -1200 | -800 |
| 0 | -800 | -400 | 400 | 800 | -1200 | -800 |
| 0 | 1600 | 800 | -800 | -1600 | 2400 | 1600 |
| 0 | 2400 | 1200 | -1200 | -2400 | 3600 | 2400 |
| 0 | -800 | -400 | 400 | 800 | -1200 | -800 |

FIG. 11

PIXEL VALUE — 21

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 100 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

HORIZONTAL DIRECTION GRADIENT — 22

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 100 | -100 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

VERTICAL DIRECTION GRADIENT — 23

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 100 | 0 | 0 | 0 |
| 0 | 0 | 0 | -100 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

PRODUCT OF HORIZONTAL DIRECTION GRADIENT AND VERTICAL DIRECTION GRADIENT — 24

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 10000 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG. 12

PIXEL VALUE 21

| | | | | | | | |
|---|---|---|---|---|---|---|---|
| 0 | 0 | 0 | 0 | 0 | 0 | 0 | 100 |
| 0 | 0 | 0 | 0 | 0 | 0 | 100 | 100 |
| 0 | 0 | 0 | 0 | 0 | 100 | 100 | 100 |
| 0 | 0 | 0 | 0 | 100 | 100 | 100 | 0 |
| 0 | 0 | 0 | 100 | 100 | 100 | 0 | 0 |
| 0 | 0 | 100 | 100 | 100 | 0 | 0 | 0 |
| 0 | 100 | 100 | 100 | 0 | 0 | 0 | 0 |
| 100 | 100 | 100 | 0 | 0 | 0 | 0 | 0 |
| 100 | 100 | 0 | 0 | 0 | 0 | 0 | 0 |

HORIZONTAL DIRECTION GRADIENT 22

| | | | | | | |
|---|---|---|---|---|---|---|
| 0 | 0 | 0 | 0 | 0 | 100 | 0 |
| 0 | 0 | 0 | 0 | 100 | 0 | 0 |
| 0 | 0 | 0 | 100 | 0 | 0 | -100 |
| 0 | 0 | 100 | 0 | 0 | -100 | 0 |
| 0 | 100 | 0 | 0 | -100 | 0 | 0 |
| 100 | 0 | 0 | -100 | 0 | 0 | 0 |
| 0 | 0 | -100 | 0 | 0 | 0 | 0 |

VERTICAL DIRECTION GRADIENT 23

| | | | | | | |
|---|---|---|---|---|---|---|
| 0 | 0 | 0 | 0 | 0 | 100 | 0 |
| 0 | 0 | 0 | 0 | 100 | 0 | 0 |
| 0 | 0 | 0 | 100 | 0 | 0 | -100 |
| 0 | 0 | 100 | 0 | 0 | -100 | 0 |
| 0 | 100 | 0 | 0 | -100 | 0 | 0 |
| 100 | 0 | 0 | -100 | 0 | 0 | 0 |
| 0 | 0 | -100 | 0 | 0 | 0 | 0 |

PRODUCT OF HORIZONTAL DIRECTION GRADIENT AND VERTICAL DIRECTION GRADIENT 24

| | | | | | | |
|---|---|---|---|---|---|---|
| 0 | 0 | 0 | 0 | 0 | 10000 | 0 |
| 0 | 0 | 0 | 0 | 10000 | 0 | 0 |
| 0 | 0 | 0 | 10000 | 0 | 0 | 10000 |
| 0 | 0 | 10000 | 0 | 0 | 10000 | 0 |
| 0 | 10000 | 0 | 0 | 10000 | 0 | 0 |
| 10000 | 0 | 0 | 10000 | 0 | 0 | 0 |
| 0 | 0 | 10000 | 0 | 0 | 0 | 0 |

FIG. 13

PIXEL VALUE 21

| | 0 | 0 | 0 | 0 | 0 | 100 | 100 |
|---|---|---|---|---|---|---|---|
| 0 | 0 | 0 | 0 | 0 | 100 | 100 | 200 |
| 0 | 0 | 0 | 0 | 100 | 100 | 200 | 200 |
| 0 | 0 | 0 | 100 | 100 | 200 | 200 | 200 |
| 0 | 0 | 100 | 100 | 200 | 200 | 200 | 255 |
| 0 | 100 | 100 | 200 | 200 | 200 | 255 | 255 |
| 100 | 100 | 200 | 200 | 200 | 255 | 255 | 255 |
| 100 | 200 | 200 | 200 | 255 | 255 | 255 | 255 |

HORIZONTAL DIRECTION GRADIENT 22

| 0 | 0 | 0 | 0 | 100 | 0 | 100 |
|---|---|---|---|---|---|---|
| 0 | 0 | 0 | 100 | 0 | 100 | 0 |
| 0 | 0 | 100 | 0 | 100 | 0 | 0 |
| 0 | 100 | 0 | 100 | 0 | 0 | 55 |
| 100 | 0 | 100 | 0 | 0 | 55 | 0 |
| 0 | 100 | 0 | 0 | 55 | 0 | 0 |
| 100 | 0 | 0 | 55 | 0 | 0 | 0 |

VERTICAL DIRECTION GRADIENT 23

| 0 | 0 | 0 | 0 | 100 | 0 | 100 |
|---|---|---|---|---|---|---|
| 0 | 0 | 0 | 100 | 0 | 100 | 0 |
| 0 | 0 | 100 | 0 | 100 | 0 | 0 |
| 0 | 100 | 0 | 100 | 0 | 0 | 55 |
| 100 | 0 | 100 | 0 | 0 | 55 | 0 |
| 0 | 100 | 0 | 0 | 55 | 0 | 0 |
| 100 | 0 | 0 | 55 | 0 | 0 | 0 |

PRODUCT OF HORIZONTAL DIRECTION GRADIENT AND VERTICAL DIRECTION GRADIENT 24

| 0 | 0 | 0 | 0 | 10000 | 0 | 10000 |
|---|---|---|---|---|---|---|
| 0 | 0 | 0 | 10000 | 0 | 10000 | 0 |
| 0 | 0 | 10000 | 0 | 10000 | 0 | 0 |
| 0 | 10000 | 0 | 10000 | 0 | 0 | 3025 |
| 10000 | 0 | 10000 | 0 | 0 | 3025 | 0 |
| 0 | 10000 | 0 | 0 | 3025 | 0 | 0 |
| 10000 | 0 | 0 | 3025 | 0 | 0 | 0 |

FIG. 14

PIXEL VALUE 21

|   | 0 | 0 | 0 | 100 | 100 | 100 | 100 |
|---|---|---|---|-----|-----|-----|-----|
| 0 | 0 | 0 | 0 | 100 | 100 | 100 | 100 |
| 0 | 0 | 0 | 0 | 100 | 100 | 100 | 100 |
| 0 | 0 | 0 | 0 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |

HORIZONTAL DIRECTION GRADIENT 22

| 0 | 0 | 0 | 100 | 0 | 0 | 0 |
|---|---|---|-----|---|---|---|
| 0 | 0 | 0 | 100 | 0 | 0 | 0 |
| 0 | 0 | 0 | 100 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

VERTICAL DIRECTION GRADIENT 23

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 100 | 100 | 100 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

PRODUCT OF HORIZONTAL DIRECTION GRADIENT AND VERTICAL DIRECTION GRADIENT 24

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

FIG. 15

PIXEL VALUE (21)

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 10 | 10 | 0 | 0 | 0 |
| 0 | 0 | 10 | 50 | 50 | 10 | 0 | 0 |
| 0 | 10 | 50 | 100 | 100 | 50 | 10 | 0 |
| 10 | 50 | 100 | 230 | 230 | 100 | 50 | 10 |

HORIZONTAL DIRECTION GRADIENT (22)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 10 | 0 | -10 | 0 | 0 |
| 0 | 10 | 40 | 0 | -40 | -10 | 0 |
| 10 | 40 | 50 | 0 | -50 | -40 | -10 |
| 40 | 50 | 130 | 0 | -130 | -50 | -40 |

VERTICAL DIRECTION GRADIENT (23)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 10 | 10 | 0 | 0 | 0 |
| 0 | 10 | 40 | 40 | 10 | 0 | 0 |
| 10 | 40 | 50 | 50 | 40 | 10 | 0 |
| 40 | 50 | 130 | 130 | 50 | 40 | 10 |

PRODUCT OF HORIZONTAL DIRECTION GRADIENT AND VERTICAL DIRECTION GRADIENT (24)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 100 | 0 | 0 | 0 | 0 |
| 0 | 100 | 1600 | 0 | -400 | 0 | 0 |
| 100 | 1600 | 2500 | 0 | -2000 | -400 | 0 |
| 1600 | 2500 | 16900 | 0 | -6500 | -2000 | -400 |

FIG. 16

PIXEL VALUE — 21

| | 39 | 80 | 104 | 142 | 237 | 93 | 89 |
|---|---|---|---|---|---|---|---|
| 8 | 118 | 223 | 206 | 215 | 230 | 168 | 107 |
| 9 | 190 | 173 | 234 | 5 | 55 | 198 | 106 |
| 211 | 198 | 71 | 245 | 237 | 54 | 228 | 155 |
| 120 | 111 | 27 | 84 | 5 | 184 | 74 | 234 |
| 173 | 215 | 24 | 214 | 200 | 186 | 189 | 19 |
| 179 | 31 | 97 | 18 | 250 | 176 | 20 | 200 |
| 195 | 46 | 82 | 214 | 45 | 92 | 200 | 114 |
| 47 | | | | | | | |

HORIZONTAL DIRECTION GRADIENT — 22

| 109 | 105 | -17 | 9 | 15 | -62 | -61 |
|---|---|---|---|---|---|---|
| -21 | -17 | 61 | -229 | 50 | 143 | -92 |
| 78 | -127 | 174 | -8 | -183 | 174 | -73 |
| -62 | -84 | 57 | -79 | 179 | -110 | 160 |
| 36 | -191 | 190 | -14 | -14 | 3 | -170 |
| -164 | 66 | -79 | 232 | -74 | -156 | 180 |
| -1 | 36 | 132 | -169 | 47 | 108 | -86 |

VERTICAL DIRECTION GRADIENT — 23

| 79 | 143 | 102 | 73 | -7 | 75 | 18 |
|---|---|---|---|---|---|---|
| 72 | -50 | 28 | -210 | -175 | 30 | -1 |
| 8 | -102 | 11 | 232 | -1 | 30 | 49 |
| -87 | -44 | -161 | -232 | 130 | -154 | 79 |
| 104 | -3 | 130 | 195 | 2 | 115 | -215 |
| -184 | 73 | -196 | 50 | -10 | -169 | 181 |
| 15 | -15 | 196 | -205 | -84 | 180 | -86 |

PRODUCT OF HORIZONTAL DIRECTION GRADIENT AND VERTICAL DIRECTION GRADIENT — 24

| 8611 | 15015 | -1734 | 657 | -105 | -4650 | -1098 |
|---|---|---|---|---|---|---|
| -1512 | 850 | 1708 | 48090 | -8750 | 4290 | 92 |
| 624 | 12954 | 1914 | -1856 | 183 | 5220 | -3577 |
| 5394 | 3696 | -9177 | 18328 | 23270 | 16940 | 12640 |
| 3744 | 573 | 24700 | -2730 | -28 | 345 | 36550 |
| 30176 | 4818 | 15484 | 11600 | 740 | -400 | 32580 |
| -15 | -540 | 25872 | 34645 | -3948 | 19440 | 7396 |

FIG. 17

| | | CONVENTIONAL METHOD (KLT METHOD) | EMBODIMENT | COMMENT |
|---|---|---|---|---|
| FILTER | ADDITION (FIXED POINT) | 2×N×N×N | 0 | |
| | SUBTRACTION (FIXED POINT) | N×N | N×N+N | |
| RELATED TO HORIZONTAL DIRECTION GRADIENT | MULTIPLICATION (FIXED POINT) | N×N | 0 | |
| | ADDITION (FIXED POINT) | N×N-1 | N-1 | |
| | SUBTRACTION (FIXED POINT) | N×N | N×N+N | |
| RELATED TO VERTICAL DIRECTION GRADIENT | MULTIPLICATION (FIXED POINT) | N×N | 0 | |
| | ADDITION (FIXED POINT) | N×N-1 | N-1 | |
| RELATED TO VERTICAL HORIZONTAL GRADIENTS | MULTIPLICATION (FIXED POINT) | N×N | N×N | |
| | ADDITION (FIXED POINT) | N×N-1 | N×N-1 | |
| | SQUARE ROOT ALGORITHM (FLOATING POINT) | 1 | 0 | |
| | ADDITION (FLOATING POINT) | 2 | 0 | |
| | SUBTRACTION (FLOATING POINT) | 2 | 0 | |
| FINAL CORRELATION VALUE | MULTIPLICATION (FLOATING POINT) | 3 | 0 | |
| | DIVISION (FLOATING POINT) | 1 | 0 | |
| | ABSOLUTE VALUE (FIXED POINT) | 0 | 3 | |
| | BIT SEARCH | 0 | 2 | |
| | MULTIPLICATION (FIXED POINT) | 0 | 3 | |
| | SQUARE ROOT ALGORITHM (FLOATING POINT) | 1 | 0 | VERY HEAVY PROCESSING |
| | DIVISION (FLOATING POINT) | 1 | 0 | VERY HEAVY PROCESSING |
| | MULTIPLICATION (FLOATING POINT) | 3 | 0 | HEAVY PROCESSING |
| | ADDITION/SUBTRACTION (FLOATING POINT) | 4 | 0 | MEDIUM |
| AGGREGATE CALCULATION | MULTIPLICATION (FIXED POINT) | 3×N×N | N×N+3 | MEDIUM |
| | ADDITION/SUBTRACTION (FIXED POINT) | 2×N×N×N+5×N×N-3 | 3×N×N×N+4×N-3 | LIGHT PROCESSING |
| | ABSOLUTE VALUE (FIXED POINT) | 0 | 3 | LIGHT PROCESSING |
| | BIT SEARCH | 0 | 2 | LIGHT PROCESSING |

METHOD OF DETERMINING A FEATURE OF AN IMAGE USING AN AVERAGE OF HORIZONTAL AND VERTICAL GRADIENTS

CROSS-REFERENCE TO RELATED APPLICATION

This application is based upon and claims the benefit of priority of the prior Japanese Patent Application No. 2009-46509 filed on Feb. 27, 2009, the entire contents of which are incorporated herein by reference.

FIELD

An aspect of the embodiments discussed herein is directed to an image processing method.

BACKGROUND

Conventionally, as a method for obtaining an image feature amount, the Kanade-Lucas-Tomasi (KLT) method is known. In the KLT method, a feature amount $R_{i,j}$ is obtained by the formula below. In the formula, i and j are coordinate values in a vertical direction and a horizontal direction respectively, and both are integers.

[Formula 1]

$$R_{i,j} = \frac{X_{i,j} + Y_{i,j} - \sqrt{(X_{i,j} - Y_{i,j})^2 + 4 \cdot XY_{i,j}^2}}{2} \quad (1)$$

In the above formula (1), $X_{i,j}$ and $Y_{i,j}$ are respectively a sum of squares of horizontal direction gradients x and a sum of squares of vertical direction gradients y of pixel values of pixel coordinates (i,j). $XY_{i,j}$ is a sum of products of horizontal direction gradients x and vertical direction gradients y of pixel values of pixel coordinates (i,j). When a target image area is 7 pixels by 7 pixels, the horizontal direction gradient x and the vertical direction gradient y are calculated after a target pixel is filtered by a 7 by 1 filter and a 1 by 7 filter to reduce noise effect.

$X_{i,j}$, $Y_{i,j}$, and $XY_{i,j}$ are represented by the formula (2), the formula (3), and the formula (4) below respectively.

[Formula 2]

$$X_{i,j} = \sum_{a=i-3}^{i+3} \sum_{b=j-3}^{j+3} x_{a,b} \times x_{a,b} \quad (2)$$

[Formula 3]

$$Y_{i,j} = \sum_{a=i-3}^{i+3} \sum_{b=j-3}^{j+3} y_{a,b} \times y_{a,b} \quad (3)$$

[Formula 4]

$$XY_{i,j} = \sum_{a=i-3}^{i+3} \sum_{b=j-3}^{j+3} x_{a,b} \times y_{a,b} \quad (4)$$

In accordance with the formula (1), when $X_{i,j}$ or $Y_{i,j}$ is 0, the feature amount $R_{i,j}$ is 0. Since the formula (5) is true when the horizontal direction gradient x and the vertical direction gradient y are the similar in accordance with the formulas (2) to (4), the feature amount $R_{i,j}$ is 0 in accordance with the formula (1). In other words, in the KLT method, a point in which there are both a horizontal direction gradient and a vertical direction gradient and the sizes of the horizontal direction gradient and the vertical direction gradient are different is defined as a feature point. Non Patent Documents 1 and 2 discuss the KLT method for obtaining an image feature amount as above.

[Formula 5]

$$X_{i,j} \times Y_{i,j} = XY_{i,j} \times XY_{i,j} \quad (5)$$

Non Patent Document 1: Bruce D. Lucas, et al. "An Iterative Image Registration Technique with an Application to Stereo Vision", Proc 7th Intl Joint Conf on Artificial Intelligence (IJCAI), Aug. 24 to 28, 1981, Vancouver, British Columbia, p. 674-679.

Non Patent Document 2: Carlo Tomasi, et al. "Detection and Tracking of Point Features", Technical Report CMU-CS-91-132, April 1991, p. 1-20.

SUMMARY

An image processing method performed by a processor for processing a plurality of pixel values in an image data representing a two-dimensional image, the image processing method including defining a block representing a part of the two-dimensional image corresponding to a predetermined number of pixels in rows and columns, obtaining an average of a gradient of pixel value on the basis of the pixel values of adjacent pixels in the block along each of at least one of rows and at least one of columns, generating a product of the average of the gradient pixel value along each of at least one of the rows and the average of the gradient pixel value along each of at least one of the columns, generating a double summation of the products of the gradient pixel values of each of the rows and the columns, and obtaining a feature amount of the block by calculation between the double summation of the products and the product of the gradients.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an illustration of an image example of vertical stripes;
FIG. 10 is an illustration of an image example of oblique stripes;
FIG. 11 is an illustration of an image example of an isolated point;
FIG. 12 is an illustration of an image example of an oblique line;
FIG. 13 is an illustration of an image example of an oblique image;
FIG. 14 is an illustration of an image example of a corner;

FIG. 15 is an illustration of an image example of a triangle;

FIG. 16 is an illustration of an image example of a random image;

FIG. 17 is a table comparing calculation amounts between the embodiment 2 and the KLT method;

DESCRIPTION OF EMBODIMENTS

As described previously, in a conventional technique, even when the area of a target image is reduced to 5 pixels by 5 pixels or 3 pixels by 3 pixels, it is desirable to take time to obtain to obtain a feature amount because a calculation amount increases when a sum of squares of horizontal (rows) and vertical (columns) direction gradients is calculated and a square root is calculated. In addition, it is desirable for a memory to have a large storage capacity required as a work area.

Hereinafter, with reference to the drawings, preferred embodiments of the image processing method, the image processor and the computer-readable storage medium, will be described in detail.

Figure 1:
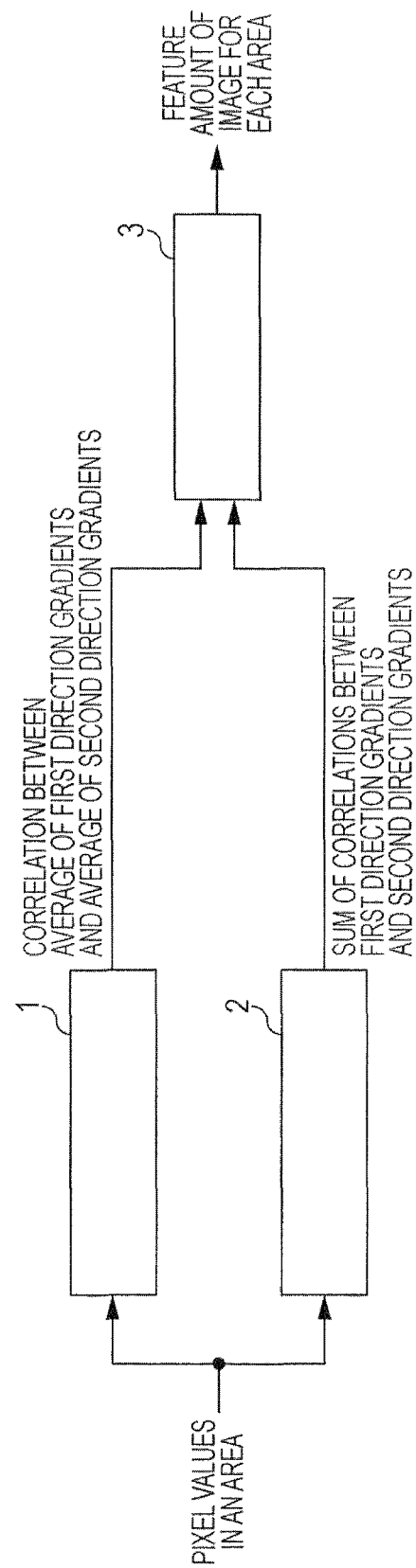
FIG. 1 is a block diagram of an embodiment 1.

FIG. 1 is a block diagram of the embodiment 1. As shown in FIG. 1, the image processing apparatus includes an average gradient generator 1, a gradient product generator 2, and a feature amount generator 3. The average gradient generator 1 obtains a correlation between an average of gradients in a first direction of an area and an average of gradients in a second direction crossing the first direction on the basis of pixel values in the area including a plurality of pixels. In other words, the average gradient generator 1 defines a block representing a part of the two-dimensional image corresponding to a predetermined number of pixels in rows and columns, obtains an average of a gradient of pixel value on the basis of the pixel values of adjacent pixels in the block along each of at least one of rows and at least one of columns, and generates a product of the average of the gradient pixel value along each of at least one of the rows and the average of the gradient pixel value along each of at least one of the columns. The gradient product generator 2 obtains a sum of correlations between first direction gradients and second direction gradients in each pixel position of the area on the basis of pixel values in the area. In other words, the gradient product generator 2 generates a double summation of the products of the gradient pixel values of each of the rows and the columns. The feature amount generator 3 obtains a feature amount of the image in the area on the basis of the correlation between the average of first direction gradients and the average of second direction gradients, and the sum of correlations between first direction gradients and second direction gradients. In other words, the feature amount generator 3 obtains a feature amount of the block by calculation between the double summation of the products and the product of the gradients.

Figure 2:
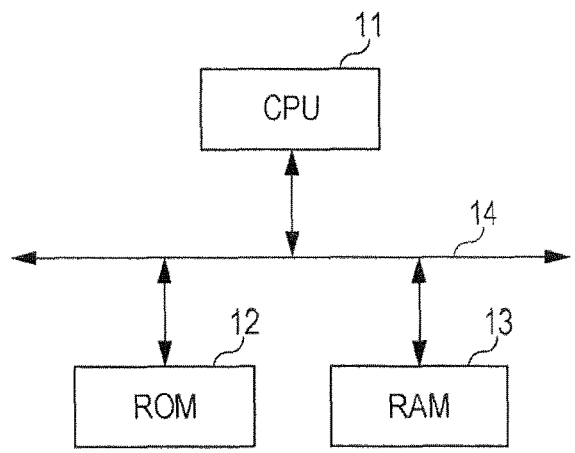
FIG. 2 is a block diagram of the embodiment 1.

FIG. 2 is a block diagram of the embodiment 1. As shown in FIG. 2, the image processing apparatus includes a calculation processing device such as a Central Processing Unit (CPU) 11, a read-dedicated memory such as a Read Only Memory (ROM) 12, a work memory such as a Random Access Memory (RAM) 13, and bus 14. The CPU 11 is connected to the ROM 12 and the RAM 13 via the bus 14. In the image processing apparatus shown in FIG. 1, the average gradient generator 1, the gradient product generator 2, and the feature amount generator 3 are realized by, for example, the CPU 11 executing an image processing program stored in the ROM 12 using the RAM 13 as the work memory. The CPU 11, the ROM 12, the RAM 13, and the bus 14 may be a part of a computer such as a personal computer and a work station, or may be a part of an apparatus which performs image processing, such as an image capturing apparatus including a digital camera and a digital video camera, and an electronic apparatus including a video image recording apparatus and a recording/reproducing apparatus.

Figure 3:
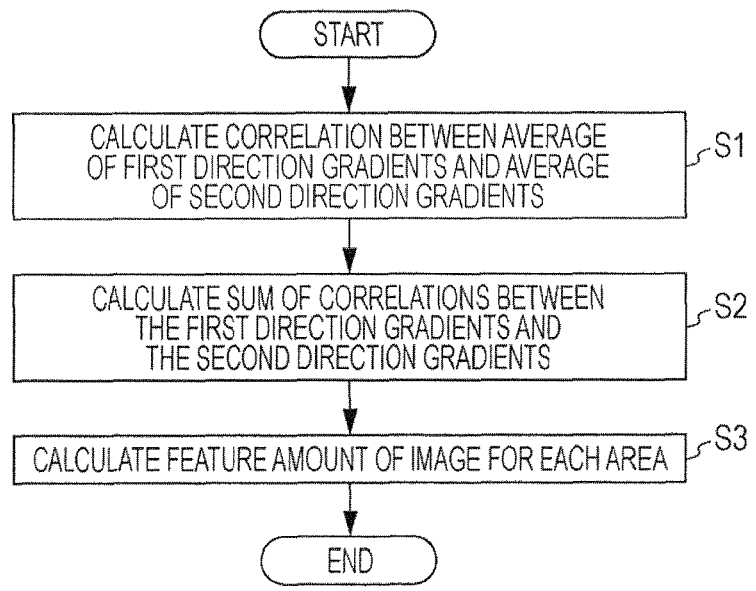
FIG. 3 is a flowchart of the embodiment 1.

FIG. 3 is a flowchart of the embodiment 1. As shown in FIG. 3, when image processing is started, first, by the average gradient generator 1, the average of first direction gradients is calculated on the basis of differences between a value of each pixel included in the area and a value of a pixel adjacent to the pixel. In the similar way as the first direction, the average of the second direction gradients is calculated by the average gradient generator 1. The correlation between the average of first direction gradients and the average of second direction gradients is obtained by the average gradient generator 1 (step S1). The sum of correlations between a first direction gradient and a second direction gradient at a position of each pixel included in the area is obtained by the gradient product generator 2 (step S2). Next, the feature amount of the image in the area is calculated by the feature amount generator 3 on the basis of the correlation between the average of first direction gradients and the average of second direction gradients calculated in step S1, and the sum of correlations between first direction gradients and second direction gradients calculated in step S2 (step S3). Thereafter, a series of image processing ends. Any of step S1 and step S2 may be performed first, or these steps may be performed at the similar time if the image processing apparatus is configured to be able to perform a plurality of processing at the similar time. When there are a plurality of processing target areas, the processing from step S1 to step S3 are performed for each of the areas.

In accordance with the embodiment 1, there is an advantage that a feature amount of an area including a plurality of pixels may be obtained. In addition, since the feature amount may be obtained without calculating a sum of squares or calculating a square root, the feature amount may be obtained with a small amount of calculation. Therefore, there is an advantage that the feature amount may be obtained in a short time. In addition, there is an advantage that the capacity of the work memory may be small. The average gradient generator 1, the gradient product generator 2, and the feature amount generator 3 may also be realized by hardware. When the above sections are realized by hardware, there is an advantage that the circuit scale is small.

In the second embodiment, the first direction and the second direction are respectively defined as a horizontal direction and a vertical direction. The size of an original image to be inputted in the image processing apparatus is defined as A pixels by B pixels. A plurality of areas into which the original image is divided are defined as blocks, and the size of each block is defined as C pixels by D pixels. A, B, C, and D are integers having a value of two or more, and C<A and D<B. A configuration of the embodiment 2 is the similar to that of the embodiment 1.

Figure 4:
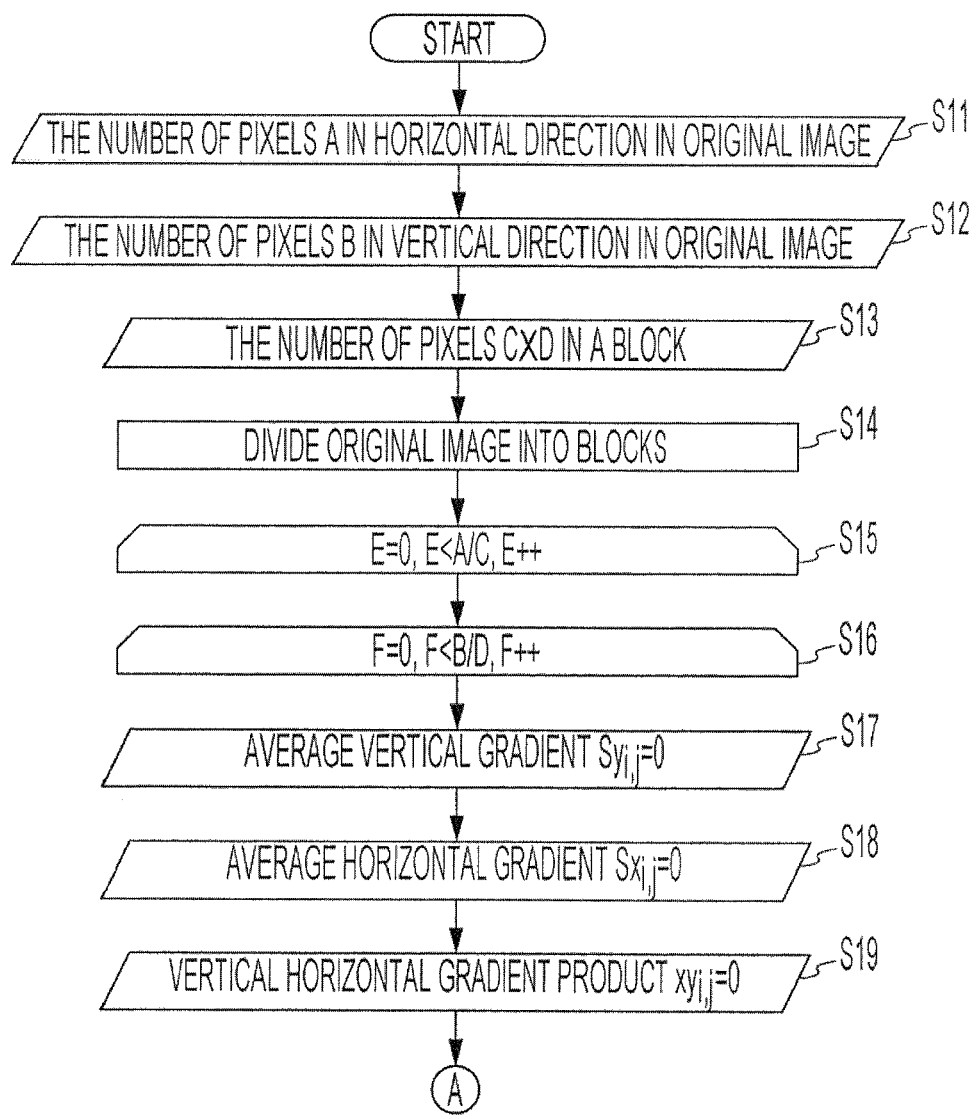
FIG. 4 is a flowchart of an embodiment 2.
Figure 5:
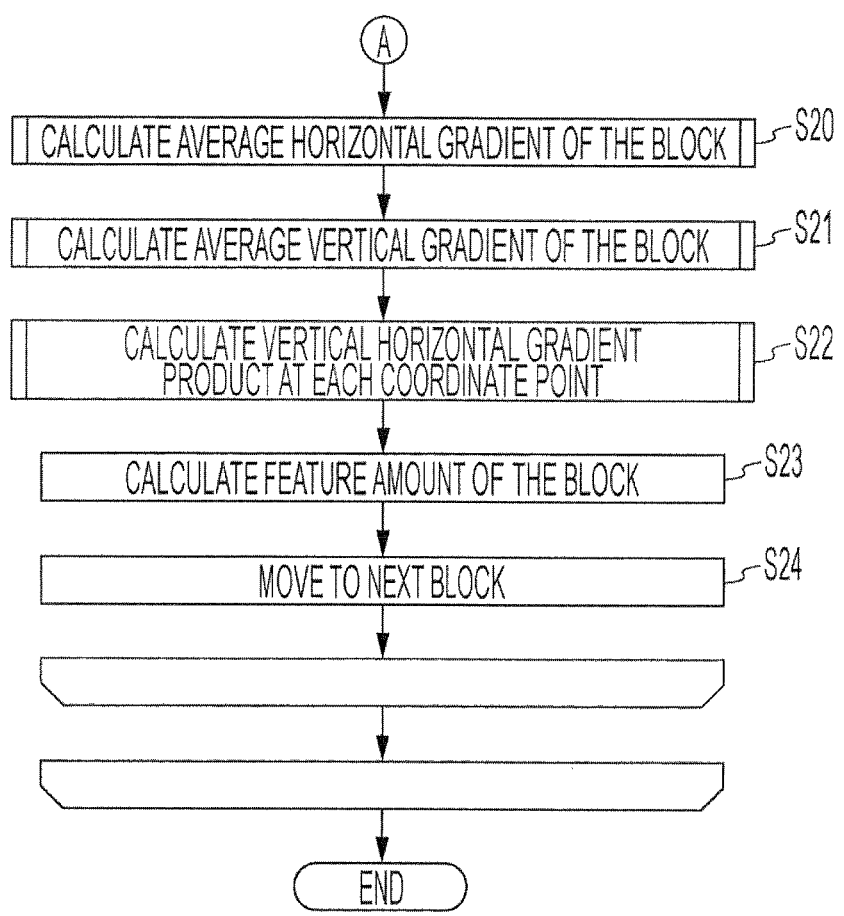
FIG. 5 is a flowchart of the embodiment 2.

FIGS. 4 to 8 are flowcharts of the embodiment 2. FIGS. 4 and 5 are flowcharts of the entire image processing procedure, and the FIG. 5 is continued from FIG. 4. As shown in FIG. 4, when the image processing is started, the number A of horizontal pixels and the number B of vertical pixels in the original image are set (step S11, step S12). Also, the number C of horizontal pixels and the number C of vertical pixels of the block are set (step S13). The size of the block, in other words, the value of C and the value of D may be arbitrarily set. Step S11 to step S13 may be performed in any order. Next, the original image is divided into blocks on the basis of the values of A, B, C, and D (step S14). When dividing the original image, the original image may be divided into a grid shape, or may be divided while each block is shifted in the horizontal direction and the vertical direction by a predetermined number of pixels, for example, 1 pixel.

Next, for a processing target block, a horizontal direction coordinate value E and a vertical direction coordinate value F in the original image are both set to 0 for example (step S15 and step S16). Next, regarding the processing target block, an average $Sy_{i,j}$ of vertical direction gradients and an average $Sx_{i,j}$ of horizontal direction gradients are both set to 0 (step S17 and step S18). Also, regarding the processing target block, a sum of products of the horizontal direction gradient x and the vertical direction gradient y of each pixel is set to 0 (step S19). Step S17 to step S19 may be performed in any order. In the accompanying drawing, to simplify representation, the average of horizontal direction gradients, the average of vertical direction gradients, and the sum of products of horizontal direction gradients and vertical direction gradients are respectively represented as an average horizontal gradient, an average vertical gradient, and a vertical horizontal gradient product. Next, regarding the processing target block, the average of horizontal direction gradients, the average of vertical direction gradients, and the sum of products of horizontal direction gradients and vertical direction gradients at each position (coordinate point) of the pixels are calculated (step S20 to step S22). Step S20 to step S22 may be performed in any order.

Figure 6:
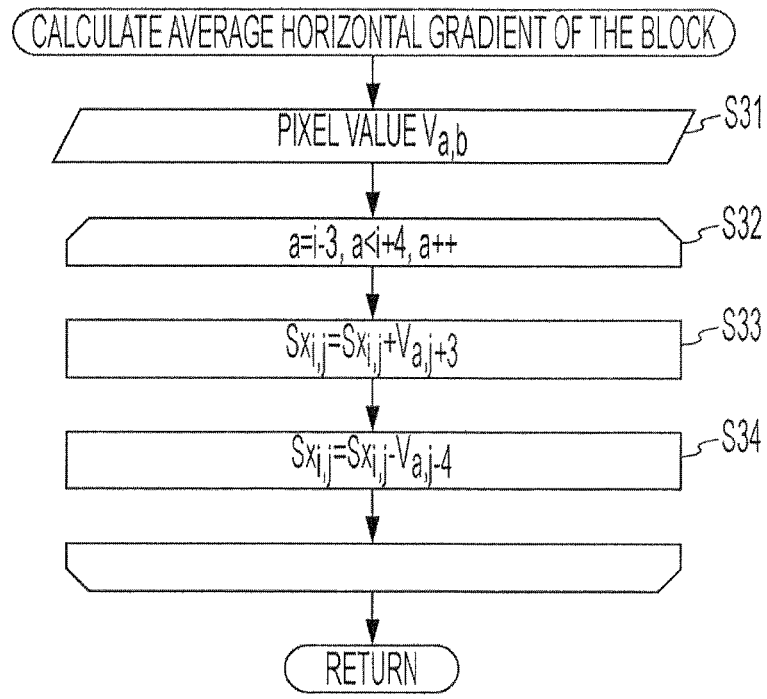
FIG. 6 is a flowchart of the embodiment 2.

FIG. 6 is a flowchart of processing for calculating an average of horizontal direction gradients. The size of the block is assumed to be 7 pixels by 7 pixels in the description for convenience, however, it is not limited to this. For example, the size of the block may be 3 pixels by 3 pixels, 5 pixels by 5 pixels, or the other. The number of pixels in the vertical direction may be different from the number of pixels in the horizontal direction. When processing for calculating the average of horizontal direction gradients is started, first, a pixel value $V_{a,b}$ is set in the processing target block (step S31). Here "a" is an integer from i–3 to i+3 wherein "i" is the vertical direction coordinate value of the pixel located in the center of the processing target block. And "b" is an integer from j–4 to j+3 wherein "j" is the horizontal direction coordinates value of the pixel located in the center of the processing target block. The pixel value $V_{a,b}$ may be, for example, a value of intensity, brightness, or color difference. Next, "a" is set to i–3 (step S32).

Next, a pixel value $V_{a,j+3}$ of a pixel whose vertical direction coordinate value is "a" and horizontal direction coordinate value is j+3 is added to the average $Sx_{i,j}$ of horizontal direction gradients (step S33). This unit that a value of a pixel which is located at the right end of a horizontal line whose vertical direction coordinate value is "a" is added to the average $Sx_{i,j}$ of horizontal direction gradients in the processing target block. Next, a pixel value $V_{a,j-4}$ of a pixel whose vertical direction coordinate value is "a" and horizontal direction coordinate value is j–4 is subtracted from the average $Sx_{i,j}$ of horizontal direction gradients (step S34). This unit that a value of a pixel which is located one pixel left from the left end of a horizontal line whose vertical direction coordinate value is "a" is subtracted from the average $Sx_{i,j}$ of horizontal direction gradients in the processing target block. In summary, by performing processing of step S33 and step S34, a gradient between the pixel located at the right end of the horizontal line and the pixel located one pixel left from the left end of the horizontal line is calculated and accumulated.

While "a" is smaller than i+4, by repeating the processing of step S33 and step S34 with "a" incremented by one each time, the average $Sx_{i,j}$ of horizontal direction gradients of the processing target block is obtained. Step S33 and step S34 may be performed in any order. Strictly speaking, although $Sx_{i,j}$ is a total sum of horizontal direction gradients, since the average is the total sum divided by the number of vertical lines, the total sum and the average are essentially the same. The processing for calculating the average of horizontal direction gradients is represented by the formula (6) below. In the formula (6), $x_{a,b}$ is a horizontal gradient at the coordinates (a, b). In other word, obtaining differences between the value of pixel located at the right end of each horizontal line and the value of pixel located one pixel left from the left end pixel of the horizontal line, and adding all the differences is the similar to obtaining differences between values of pixels next to each other in the horizontal direction for all the pixels in the block, and adding all the differences.

[Formula 6]

$$Sx_{i,j} = \sum_{a=i-3}^{i+3} (V_{a,j+3} - V_{a,j-4}) = \sum_{a=i-3}^{i+3} \sum_{b=j-3}^{j+3} x_{a,b} \qquad (6)$$

Figure 7:
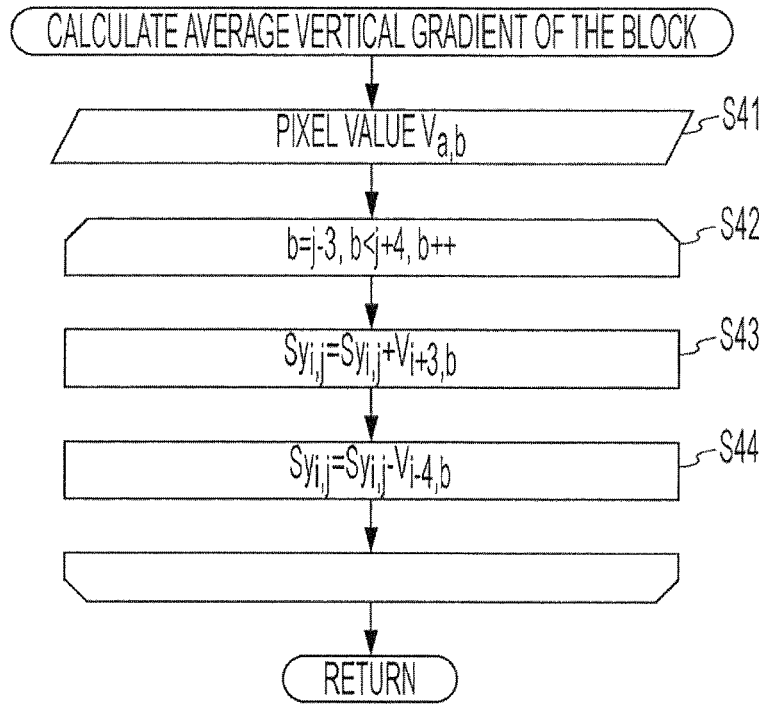
FIG. 7 is a flowchart of the embodiment 2.

FIG. 7 is a flowchart of processing for calculating an average of vertical direction gradients. The size of the block is assumed to be 7 pixels by 7 pixels in the description for convenience, however, it is not limited to this. When processing for calculating the average of vertical direction gradients is started, first, a pixel value $V_{a,b}$ is set in the processing target block (step S41). Here "a" is an integer from i–4 to i+3 wherein "i" is the vertical direction coordinate value of the pixel located in the center of the processing target block. And "b" is an integer from j–3 to j+3 wherein "j" is the horizontal direction coordinates value of the pixel located in the center of the processing target block. Next, "b" is set to j–3 (step S42).

Next, a pixel value $V_{i+3,b}$ of the pixel whose horizontal direction coordinate value is "b" and vertical direction coordinate value is i+3 is added to the average $Sy_{i,j}$ of vertical direction gradients (step S43). This unit that a pixel value of a pixel which is located at the bottom end of a vertical line whose horizontal direction coordinate value is "b" is added to the average $Sy_{i,j}$ of vertical direction gradients in the processing target block. Next, a pixel value $V_{i-4,b}$ of a pixel whose horizontal direction coordinate value is "b" and vertical direction coordinate value is i–4 is subtracted from the average $Sy_{i,j}$ of vertical direction gradients (step S44). This unit that a value of a pixel which is located at one pixel upward from the top end of a vertical line whose horizontal direction coordinate value is "b" is subtracted from the average $Sy_{i,j}$ of vertical direction gradients in the processing target block. In summary, by performing processing of step S43 and step S44, a gradient between the pixel located at the bottom end of the vertical line and the pixel located at one pixel upward from the top end of the vertical line is calculated and accumulated.

While "b" is smaller than j+4, by repeating the processing of step S43 and step S44 with "b" incremented by one each time, the average $Sy_{i,j}$ of vertical direction gradients is obtained in the processing target block. Step S43 and step S44 may be performed in any order. Although, like $Sx_{i,j}$, $Sy_{i,j}$ is also a total sum of vertical direction gradients, $Sy_{i,j}$ and the average are essentially the same. The processing for calculating the average of vertical direction gradients is represented by the formula (7) below. In the formula (7), $y_{a,b}$ is a vertical gradient at the coordinates (a, b). In other word, obtaining differences between the value of pixel located at the bottom end of each vertical line and the value of pixel located one pixel upward from the top end pixel of the vertical line, and adding all the differences is the similar to obtaining differences between values of pixels next to each other in the vertical direction for all the pixels in the block, and adding all the differences.

[Formula 7]

$$Sy_{i,j} = \sum_{b=j-3}^{j+3} (V_{i+3,b} - V_{i-4,b}) = \sum_{a=i-3}^{i+3} \sum_{b=j-3}^{j+3} y_{a,b} \qquad (7)$$

Figure 8:
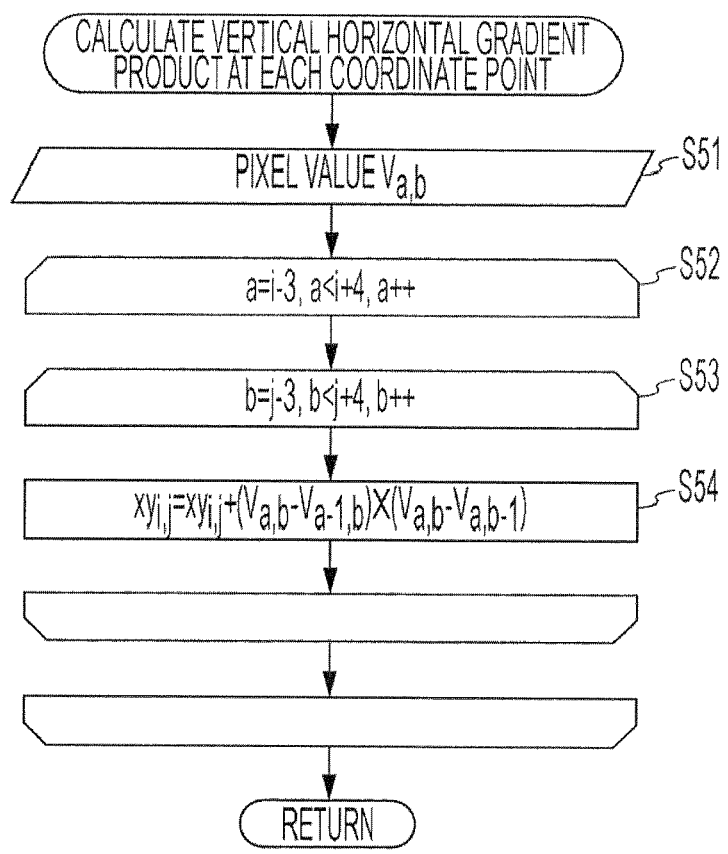
FIG. 8 is a flowchart of the embodiment 2.

FIG. 8 is a flowchart of processing for calculating a sum of products of horizontal direction gradients and vertical direction gradients of each pixel position. The size of the block is assumed to be 7 pixels by 7 pixels in the description for convenience, however, it is not limited to this. When processing for calculating the sum of products of horizontal direction gradients and vertical direction gradients is started, first, a pixel value $V_{a,b}$ is set in the processing target block (step S51). Here "a" is an integer from i−3 to i+3 wherein "i" is the vertical direction coordinate value of the pixel located in the center of the processing target block. And "b" is an integer from j−3 to j+3 wherein "j" is the horizontal direction coordinates value of the pixel located in the center of the processing target block. Next, "a" is set to i−3, and b is set to j−3 (step S52, step S53). Step S52 and step S53 may be performed in any order.

Next, a product of horizontal direction gradient and vertical direction gradient of a pixel whose vertical direction coordinate value is "a" and horizontal direction coordinate value is "b" is added to the sum $xy_{i,j}$ of products of horizontal direction gradients and vertical direction gradients (step S54). The vertical direction gradient is a value in which the value $V_{a-1,b}$ of a pixel whose vertical direction coordinate value is a−1 and horizontal direction coordinate value is "b" is subtracted from the value $V_{a,b}$ of a pixel whose vertical direction coordinate value is "a" and horizontal direction coordinate value is "b". The horizontal direction gradient is a value in which the value $V_{a,b-1}$ of a pixel whose vertical direction coordinate value is "a" and horizontal direction coordinate value is b−1 is subtracted from $V_{a,b}$.

While "b" is smaller than j+4, by repeating the processing of step S54 with "b" incremented by one each time, and while "a" is smaller than i+4, by repeating the processing of step S54 with "a" incremented by one each time, the sum $xy_{i,j}$ of products of horizontal direction gradients and vertical direction gradients is obtained in the processing target block. The processing for calculating the sum of products of horizontal direction gradients and vertical direction gradients of each pixel position is represented by the formula (8). In the formula (8), $x_{a,b}$ and $y_{a,b}$ is respectively the horizontal direction gradient and the vertical direction gradient at the coordinates (a, b).

[Formula 8]

$$xy_{i,j} = \sum_{a=i-3}^{i+3} \sum_{b=j-3}^{j+3} x_{a,b} \times y_{a,b} \qquad (8)$$

When returning to the flowchart of FIG. 5, and return values of the average $Sx_{i,j}$ of horizontal direction gradients, the average $Sy_{i,j}$ of vertical direction gradients, and the sum $xy_{i,j}$ of products of horizontal direction gradients and vertical direction gradients are obtained, the feature amount of the block is calculated (step S23). The feature amount $R_{i,j}$ of the block is obtained, for example, by performing calculation of the formula (9) below.

[Formula 9]

$$R_{i,j} = |xy_{i,j}/(Sx_{i,j} \times Sy_{i,j})| \qquad (9)$$

Otherwise, when a logarithmic function is used, the division is converted into subtraction. Therefore, the feature amount $R_{i,j}$ of the block is also obtained by performing calculation represented by the formula (10) below. In the formula (10), since the part "×7×7" represents the product of the number of horizontal direction pixels and the number of vertical direction pixels, when the numbers of horizontal and vertical direction pixels are respectively C and D, "×7×7" is "×C×D". Multiplying by 1.5 is for rounding into an integer.

[Formula 10]

$$R_{i,j} = |3.322 \times Log_{10}(1.5 \times 7 \times 7 \times |xy_{i,j}|) - 3.322 \times Log_{10}(1.5 \times |Sx_{i,j} \times Sy_{i,j}|)|. \qquad (10)$$

In the above formula (10), since $3.322 \times \log_{10} Z$ is approximately equal to $\log_2 Z$, $3.322 \times \log_{10}(1.5 \times 7 \times 7 \times |xy_{i,j}|)$ and $3.322 \times \log_{10}(1.5 \times |Sx_{i,j} \times Sy_{i,j}|)$ may be obtained by, for example, a bit search function of the CPU. Therefore, the feature amount $R_{i,j}$ may be obtained by performing bit search. For example, a first bit position of "1" is searched from the Most Significant Bit (MSB) to the Least Significant Bit (LSB) in the value of a first term of the above formula (10) which is represented in binary. When the first bit position where the value of the bit is 1 is found, the bit position of the first "1" is defined as K. When the value of a bit one-bit shifted from K to the LSB side is also 1, 1 is added to K. This corresponds to the above mentioned rounding. When values of all the bits are 0, K is set to 0. The result of the bit search is provided by K+1. The above is the same for a second term of the formula (10). An absolute value of a value obtained by subtracting the bit search result of the second term from the bit search result of the first term is the feature amount $R_{i,j}$ of the block.

When the feature amount $R_{i,j}$ of the block is obtained by any of the above methods, the process moves to the next block (step S24), the processing of step S15 and after described above are performed on the new block. When the feature amounts $R_{i,j}$ of all the blocks are obtained, a series of processing ends.

Specific examples are shown in FIGS. 9 to 16. In these specific examples, for example, the size of a block is assumed to 7 pixels by 7 pixels. In FIGS. 9 to 16, reference numeral 21 denotes a list of pixel values. Reference numerals 22, 23, and 24 respectively denote a list of horizontal direction gradients, a list of vertical direction gradients, and a list of products of horizontal direction gradients and vertical direction gradients corresponding to the list of pixel values 21. In the calculation of the formula (10), when Z in $3.322 \times \log_{10} Z$ is smaller than 1, Z is assumed to be 1. This is a measure of convenience so that the logarithm calculation does not fail, and this is not an essential matter.

FIG. 9 is an image example of vertical stripes. In the example shown in FIG. 9, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 980, 0, and 0 respectively. Therefore, in accordance with the formula (10), the feature amount $R_{i,j}$ of the block is 0. In other words, when the average $Sy_{i,j}$ of vertical direction gradients is 0, the feature amount $R_{i,j}$ of the block is 0. In the case of an image of horizontal stripes, the average $Sx_{i,j}$ of horizontal direction gradients is 0, so that the feature amount $R_{i,j}$ of the block is 0.

FIG. 10 is an image example of oblique stripes. In the example shown in FIG. 10, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 700, 560, and 8000 respectively. Therefore, in accordance with the formula (10), the feature amount $R_{i,j}$ of the block is 0.

FIG. 11 is an image example of an isolated point. In the example shown in FIG. 11, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 0, 0, and 10000 respectively. Therefore, in accordance with the formula (10), the feature amount $R_{i,j}$ of the block is 18.

FIG. 12 is an image example of an oblique line. In the example shown in FIG. 12, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 100, 100, and 110000 respectively. Therefore, in accordance with the formula (10), the feature amount $R_{i,j}$ of the block is 9.

FIG. 13 is an image example of an oblique image. In the example shown in FIG. 13, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 1420, 1420, and 132100 respectively. Therefore, in accordance with the formula (10), the feature amount $R_{i,j}$ of the block is 2.

FIG. 14 is an image example of a corner. In the example shown in FIG. 14, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 300, 300, and 0 respectively. Therefore, in accordance with the formula (10), the feature amount $R_{i,j}$ of the block is 16.

FIG. 15 is an image example of a triangle. In the example shown in FIG. 15, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 0, 770, and 15300 respectively. Therefore, in accordance with the formula (10), the feature amount $R_{i,j}$ of the block is 19.

FIG. 16 is an image example of a random image. In the example shown in FIG. 16, in accordance with the formula (6), the formula (7), and the formula (8), the average $Sx_{i,j}$ of horizontal direction gradients, the average $Sy_{i,j}$ of vertical direction gradients, and the sum $xy_{i,j}$ of products of horizontal direction gradients and vertical direction gradients are 1, 9, and 415783 respectively. Therefore, in accordance with the formula (10), the feature amount $R_{i,j}$ of the block is 21.

As it is obvious from the examples of FIGS. 9 to 16, when there is a perfect correlation between a set of the average $Sx_{i,j}$ of horizontal direction gradients and the average $Sy_{i,j}$ of vertical direction gradients, and the sum $xy_{i,j}$ of products of horizontal direction gradients and vertical direction gradients, the feature amount $R_{i,j}$ of the block is 0. When there is a correlation between a set of the average $Sx_{i,j}$ of horizontal direction gradients and the average $Sy_{i,j}$ of vertical direction gradients, and the sum $xy_{i,j}$ of products of horizontal direction gradients and vertical direction gradients, the feature amount $R_{i,j}$ of the block is a value corresponding to the degree of correlation. When the correlation is large, the feature amount $R_{i,j}$ of the block is a small value, and when the correlation is small, the feature amount $R_{i,j}$ of the block is a large value.

FIG. 17 is a table comparing calculation amounts between the feature amount calculation method of the embodiment 2 and the KLT method when calculating the feature amount $R_{i,j}$ of one block. In the second embodiment, the calculation of formula (10) is performed by using a bit search, and in the KLT method, the calculation of formula (1) is performed. The size of the block is assumed to be N pixels by N pixels. In the KLT method, a calculation amount (2×N×N×N addition) in a preprocessing filter is included. As it is obvious from FIG. 17, in the KLT method, heavy processing such as sum of squares and square root has to be performed many times. On the other hand, in the embodiment 2, since there is no calculation of sum of squares and square root, light processing is generally required. Therefore, in accordance with the embodiment 2, the feature amount of an area including a plurality of pixels may be obtained in a shorter time compared with conventional methods. In addition, capacity of memory used as a work area may be small compared with conventional methods.

Figure 18:
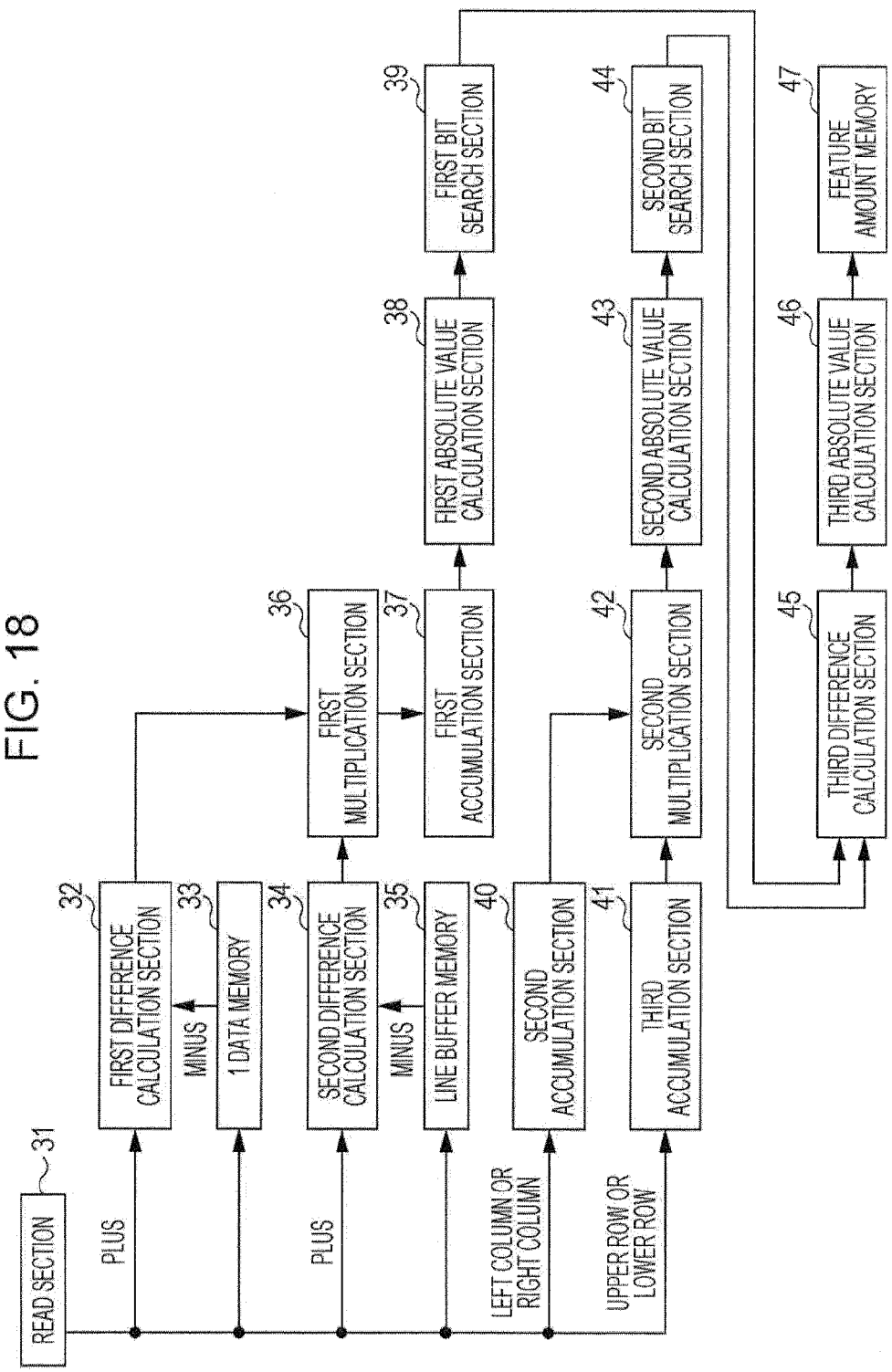
FIG. 18 is a block diagram of an embodiment 3.

FIG. 18 is a block diagram of the embodiment 3. The embodiment 3 is hardware which configures the image processing apparatus described in the embodiment 2. As described in FIG. 18, the image processing apparatus includes a read section 31, a first difference calculation section 32, a 1 data memory 33, a second difference calculation section 34, a line buffer memory 35, a first multiplication section 36, a first accumulation section 37, a first absolute value calculation section 38, and a first bit search section 39.

The read section 31 reads values of each pixel in a divided block from a memory in which original image is stored. For example, the read section 31 may repeat reading of pixel values from the pixel located one pixel left from the left end pixel to the right end pixel of the block in the horizontal direction sequentially, from the horizontal direction line located one line upward from the top end of the block to the horizontal line at the bottom end of the block in the vertical direction sequentially.

The 1 data memory 33 holds the pixel value read from the read section 31, and outputs the pixel value at a cycle when the next pixel value is read from the read section 31. The first difference calculation section 32 calculates a difference between the pixel value read from the read section 31 and the pixel value outputted from the 1 data memory 33. For example, the first difference calculation section 32 may subtract the pixel value outputted from the 1 data memory 33 from the pixel value read from the read section 31. The first difference calculation section 32 includes, for example, an addition circuit.

The line buffer memory 35 holds the pixel values of one line read from the read section 31, and in an order in which each pixel value is read from the read section 31, outputs the pixel values at a cycle when the pixel values of next line are read from the read section 31. When the read section 31 reads pixel values in the above described order, pixel values of one line in the horizontal direction are held in the line buffer memory 35.

The second difference calculation section 34 calculates differences between the pixel values of one line read from the read section 31 and the pixel values of one line outputted from the line buffer memory 35. For example, the second difference calculation section 34 may subtract the pixel values outputted from the line buffer memory 35 from the pixel values read from the read section 31. The second difference calculation section 34 includes, for example, an addition circuit.

The first multiplication section 36 performs multiplication of the value outputted from the first difference calculation section 32 and the value outputted from the second difference calculation section 34. The first accumulation section 37 calculates an accumulated added value of the values outputted from the first multiplication section 36. The first accumulation section 37 includes, for example, an addition circuit. The first absolute value calculation section 38 obtains the absolute value of the value outputted from the first accumulation section 37. The sum $xy_{i,j}$ of products of horizontal direction gradients and vertical direction gradients, which is described in the embodiment 2, is outputted from the first accumulation section 37. The first bit search section 39 performs a bit search on the value outputted from the first absolute value calculation section 38.

The image processing apparatus includes a second accumulation section 40, a third accumulation section 41, a second multiplication section 42, a second absolute value calculation section 43, and a second bit search section 44. The second accumulation section 40 obtains a difference between the pixel values at both left and right ends of the pixels in a horizontal direction line read from the read section 31. The second accumulation section 40, for example, in the pixels of a horizontal direction line read from the read section 31, may subtract the value of the right end pixel from the value of the pixel located one pixel left from the left end pixel in the block. The second accumulation section 40 calculates an accumulated added value of the differences obtained for each horizontal direction line. The second accumulation section 40 includes, for example, an addition circuit.

The third accumulation section 41 obtains a difference between the pixel values at both top and bottom ends of the pixels in a vertical direction line read from the read section 31. The third accumulation section 41, for example, in the pixels of a vertical direction line read from the read section 31, may subtract the value of the bottom end pixel from the value of the pixel located one pixel upward from the top end pixel in the block. The third accumulation section 41 calculates an accumulated added value of the differences obtained for each vertical direction line. The third accumulation section 41 includes, for example, an addition circuit.

The second multiplication section 42 performs multiplication of the value outputted from the second accumulation section 40 and the value outputted from the third accumulation section 41. The average $Sx_{i,j}$ of horizontal direction gradients and the average $Sy_{i,j}$ of vertical direction gradients, which are respectively described in the embodiment 2, are outputted from the second accumulation section 40 and the third accumulation section 41. The second absolute value calculation section 43 obtains the absolute value of the value outputted from the second multiplication section 42. The second bit search section 44 performs a bit search on the value outputted from the second absolute value calculation section 43.

The image processing apparatus includes a third difference calculation section 45, a third absolute value calculation section 46, and a feature amount memory 47. The third difference calculation section 45 calculates a difference between the value outputted from the first bit search section 39 and the value outputted from the second bit search section 44. The third difference calculation section 45 may subtract the value outputted from the second bit search section 44 from the value outputted from the first bit search section 39. The third difference calculation section 45 includes, for example, an addition circuit.

The third absolute value calculation section 46 obtains the absolute value of the value outputted from the third absolute value calculation section 46. The feature amount $R_{i,j}$ of the block, which is described in the embodiment 2, is outputted from the third absolute value calculation section 46. The feature amount memory 47 stores the value outputted from the third absolute value calculation section 46. The first difference calculation section 32, the 1 data memory 33, the second difference calculation section 34, the line buffer memory 35, the first multiplication section 36, and the first accumulation section 37 operate as the gradient product generator. The second accumulation section 40, the third accumulation section 41, and the second multiplication section 42 operate as the average gradient generator. The first absolute value calculation section 38, the first bit search section 39, the second absolute value calculation section 43, the second bit search section 44, the third difference calculation section 45, and the third absolute value calculation section 46 operate as the feature amount generator. An example of the first bit search section 39 or the second bit search section 44 will be described.

Figure 19:
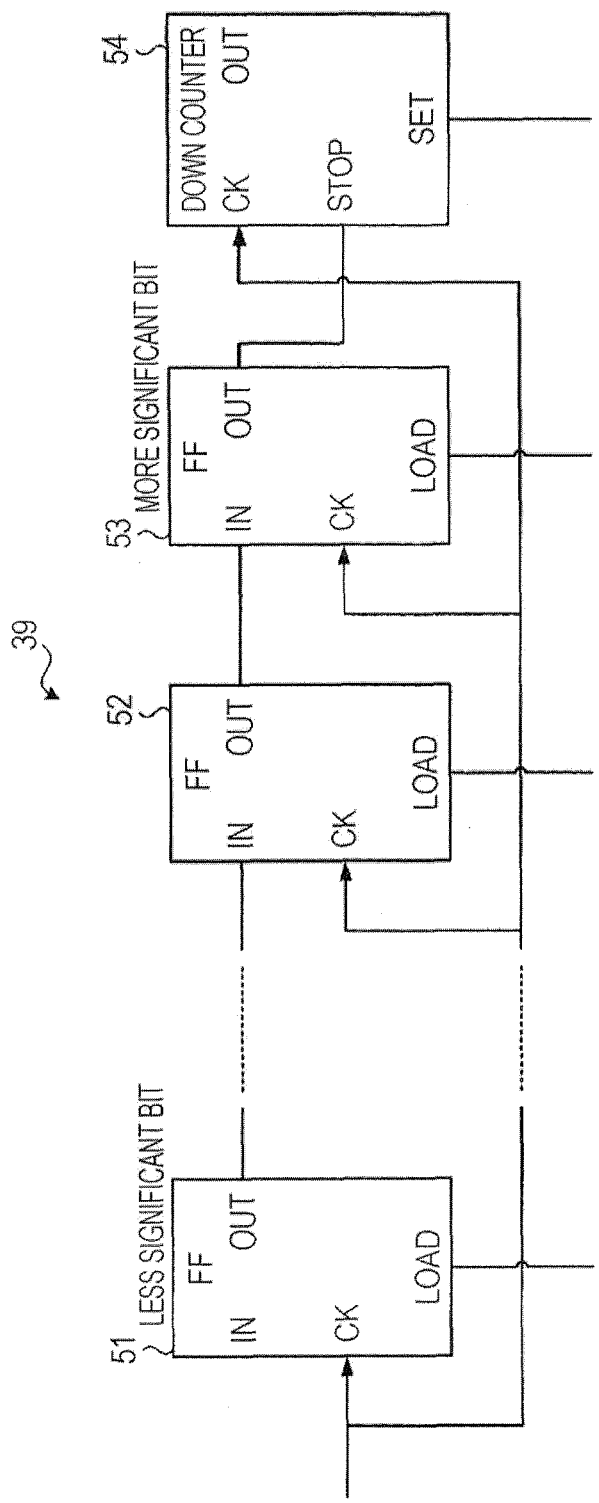
FIG. 19 is a block diagram of the embodiment 3.

FIG. 19 is a block diagram of the embodiment 3. Since the first bit search section 39 and the second bit search section 44 have the similar configuration, the first bit search section 39 will be described. As shown in FIG. 19, the first bit search section 39 includes, for example, a shift register including a plurality of flip-flops 51, 52, and 53, and a down counter 54. The flip-flops, the number of which corresponds to the number of bits of data inputted into the first bit search section 39, are connected in series in the shift register. Output data from the first absolute value calculation section 38 is inputted into the flip-flops 51, 52, and 53 via a LOAD terminal, one bit by one bit. The data is shifted one by one in synchronization with a clock, for example, at a rising edge timing of the clock, from the flip-flop 51 on the LSB side to the flip-flop 53 on the MSB side. Output data from the flip-flop 53 on the MSB side is inputted into a STOP terminal of the down counter 54.

A value corresponding to the number of flip-flips in the shift register is set in the down counter 54 as an initial value. The down counter 54 decrements the count value by one in synchronization with the clock, for example, at the rising edge timing of the clock. The down counter 54 decrements the count value while 0 is inputted into the STOP terminal, and stops when 1 is inputted into the STOP terminal. Therefore, from the count value of the down counter 54 obtained when the down counter 54 stops, in a bit string of the data inputted into the first bit search section 39, a bit position of "1" nearest to MSB and farthest to LSB is obtained. However, in the configuration shown in FIG. 19, an operation corresponding to a rounding operation performed when a value of the bit one-bit-shifted to the LSB side from the bit position of "1" is 1 is not performed.

Figure 20:
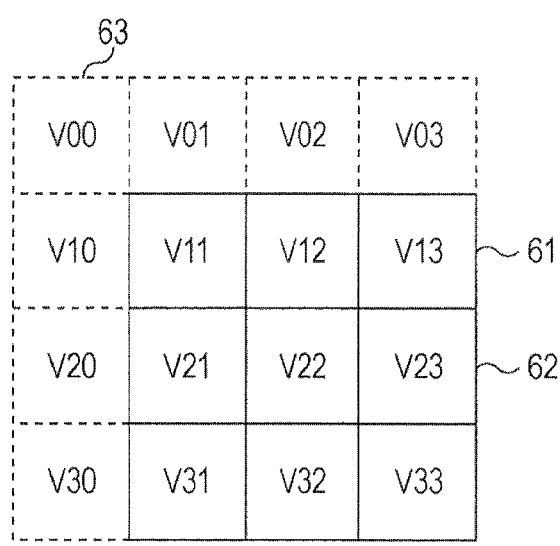
FIG. 20 is an illustration of an image example of the embodiment 3.
Figure 21:
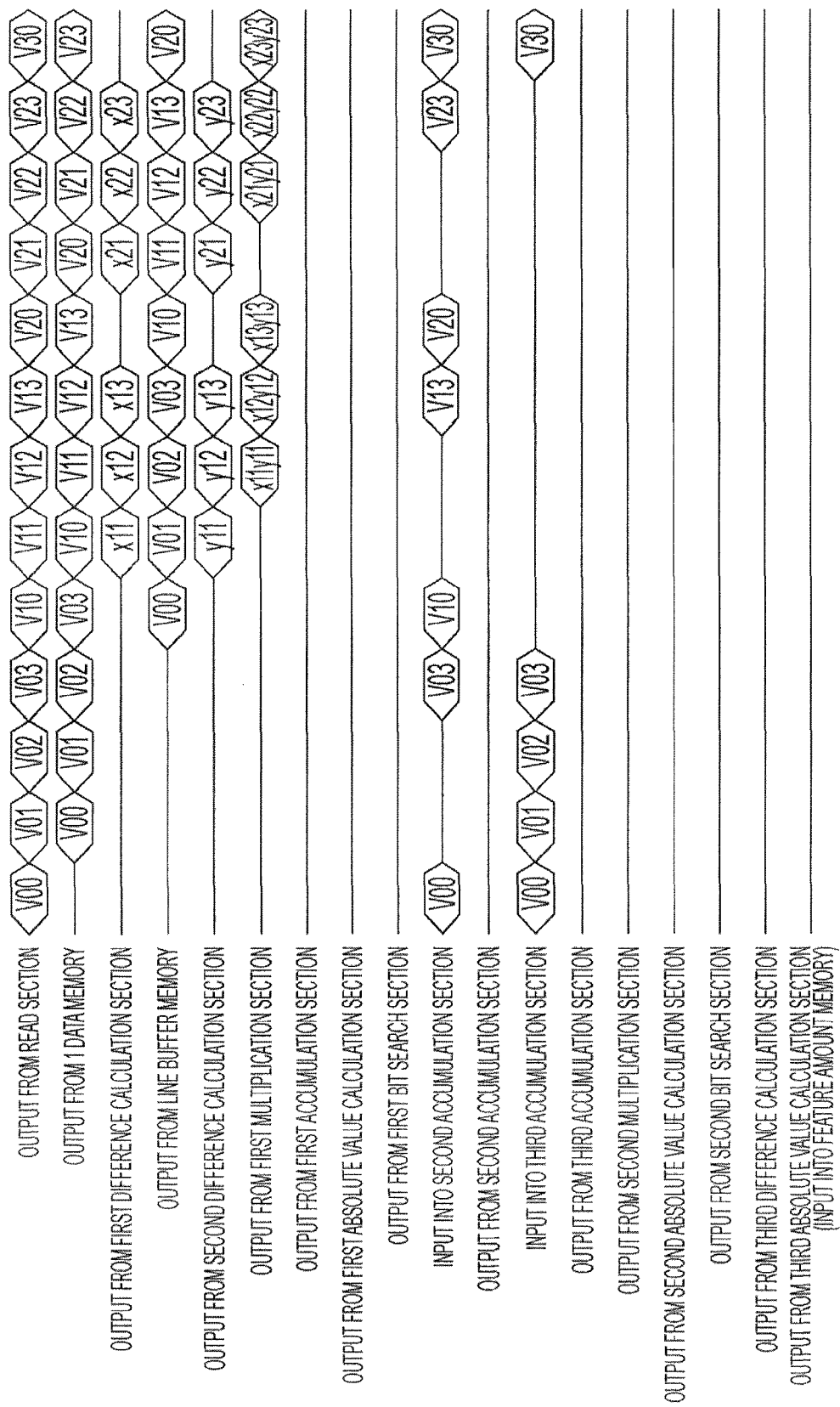
FIG. 21 is a timing chart of the embodiment 3.
Figure 22:
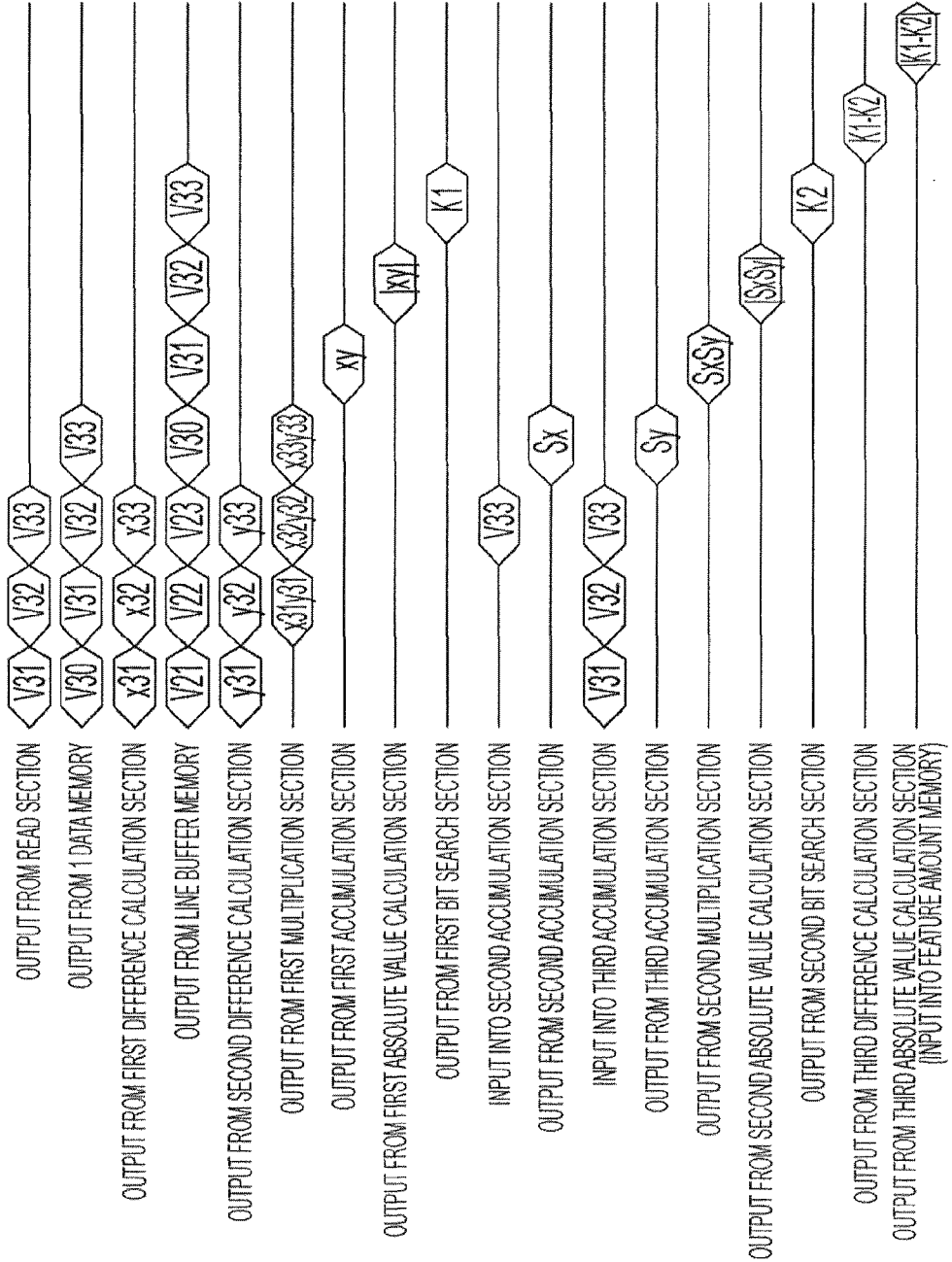
FIG. 22 is a timing chart of the embodiment 3.

FIG. 20 is an illustration of an image example of the embodiment 3. FIGS. 21 and 22 are timing charts of the embodiment 3, and FIG. 22 is a continuation of FIG. 21. For the sake of convenience, the size of a block is assumed to 3 pixels by 3 pixels, for example. As shown in FIG. 20, each pixel 62 included in a block 61 is represented by a solid line rectangle, and values of each pixel are defined as V11, V12, V13, V21, ..., V33. The pixels 63, which are located outside the block 61 and are represented by dashed line rectangles, are necessary pixels to obtain the horizontal direction gradients and the vertical direction gradients of the pixels. The values of the pixels above the top end of the block 61 are defined as V00, ..., V03, and the values of the pixels on the left of the left end of the block 61 are defined as V00, ..., V30.

As shown in FIGS. 21 and 22, the values of each pixel are read in order of, for example, V00, V01 ..., V10, V11, ..., V20, V21, ..., V30, V31, ..., V33 by the read section 31. The read pixel value is held by the 1 data memory 33, and outputted at the next pixel value read cycle of the read section 31. The read pixel values are held by the line buffer memory 35 one line by one line in the horizontal direction, and outputted at a read cycle of the read section 31 for the next one line in the horizontal direction. Each calculation result is outputted from the first difference calculation section 32 and the second difference calculation section 34 at the similar timing, and the calculation results are multiplied by the first multiplication section 36. In FIGS. 21 and 22, x11, x12, ... are the horizontal gradients, and y11, y12, ... are the vertical gradient. And, x11 y11, x12 y12, ... are the products of horizontal direction gradients and vertical direction gradients. After the value V33 of the last pixel in the block is read by the read section 31, the sum xy of products of horizontal direction gradients and vertical direction gradients is outputted from the first accumulation section 37. Thereafter, a bit search result K1 is outputted from the first bit search section 39.

On the other hand, the operation below is performed in parallel after the reading of the pixel values by the read section 31 is started until the search result K1 is outputted from the first bit search section 39. After the value V33 of the last pixel in the block is read by the read section 31, the average Sx of horizontal direction gradients and the average Sy of vertical direction gradients are outputted at the similar timing respectively from the second accumulation section 40 and the third accumulation section 41, and the averages Sx and Sy are multiplied by the second multiplication section 42. In FIG. 22, SxSy is the product of the average of horizontal direction gradients and the average of vertical direction gradients. At the timing when the bit search result K1 is outputted from the first bit search section 39, the bit search result K2 is outputted from the second bit search section 44. In the subsequent cycles, the difference between K1 and K2 (K1−K2) is obtained, and the absolute value of the difference is stored in the feature amount memory 47 as the feature amount of the block. In accordance with the embodiment 3, the feature amount of an area including a plurality of pixels may be obtained in a shorter time compared with conventional methods.

Figure 23:
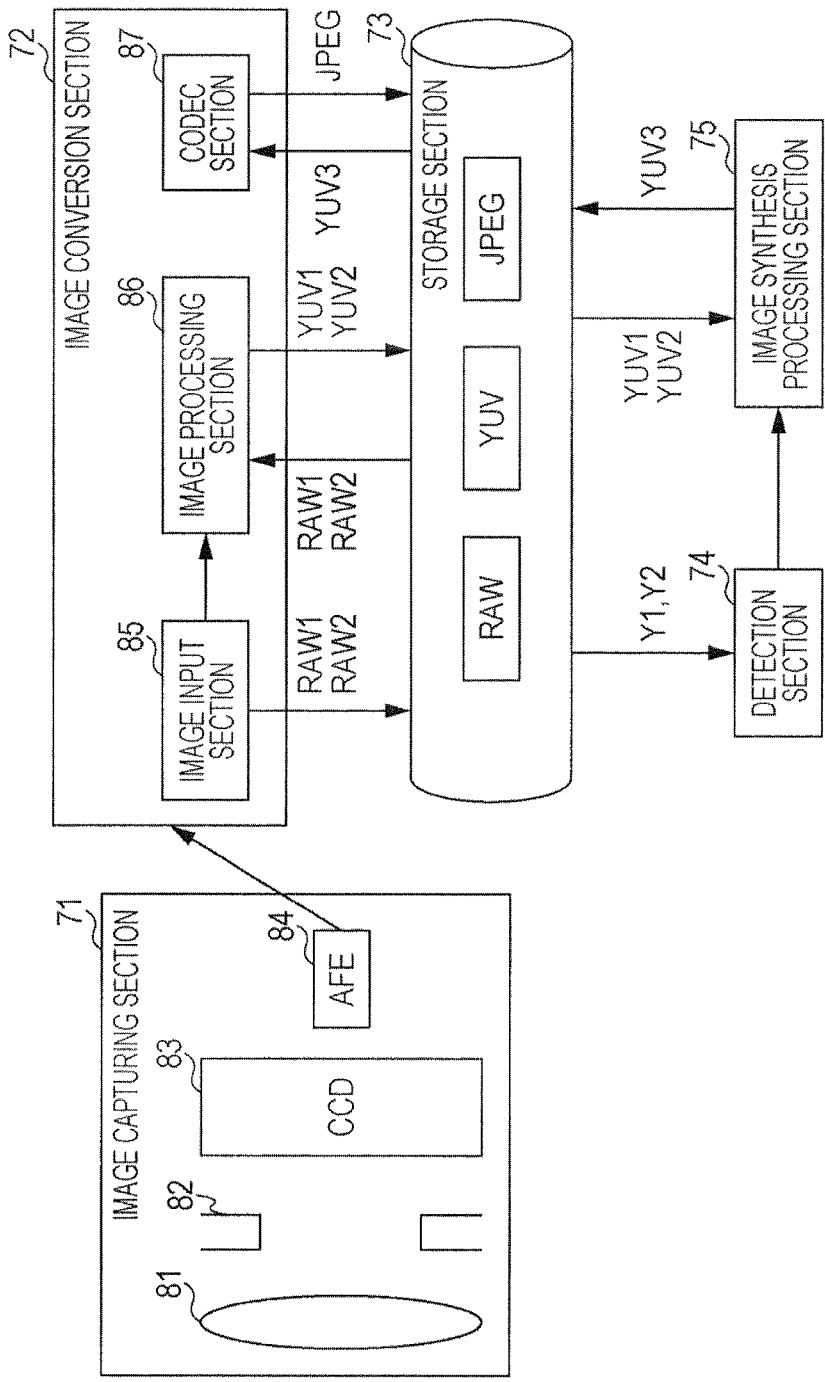
FIG. 23 is a block diagram of an embodiment 4.

FIG. 23 is a block diagram of the embodiment 4. The embodiment 4 is an image capturing apparatus to which each image processing apparatus of the embodiments 1 to 3 are applied. As an image capturing apparatus, for example, there are a digital camera (including one installed in a mobile phone), a digital video camera, and a mobile type scanner which capture a subject image and obtain a digital image. As an example, a case in which camera shake correction processing is performed in a digital camera will be described. In the camera shake correction processing, an amount of displacement between two images is detected, the displacement is corrected, and the two images are synthesized.

As shown in FIG. 23, the image capturing apparatus includes an image capturing section 71, an image conversion section 72, a storage section 73, a detection section 74, and an image synthesis processing section 75. The image capturing section 71 captures a subject image. The image capturing section 71 includes, for example, a lens 81, an iris 82, image capturing devices such as Charge Coupled Devices (CCD) 83, and an Analog Front End (AFE) 84. In the image capturing section 71, a light source of reflected light from the subject image is received by the CCD 83 via the lens 81 and the iris 82, and a signal photoelectric-converted by the CCD 83 is converted into digital data by the AFE 84. In place of the CCD 83, as an image capturing device, a Complementary Metal Oxide Semiconductor (CMOS) image sensor may be installed.

The image conversion section 72 converts the data digitalized by the AFE 84 into RAW data, YUV data, or Joint Photographic Experts Group (JPEG) data. The image conversion section 72 includes an image input section 85, an image processing section 86, and a codec section 87. The image input section 85 performs a RAW format conversion on the inputted digital data. The RAW data (RAW1, RAW2) of two images converted by the image input section 85 are accumulated in the storage section 73. The image processing section 86 performs noise reduction processing and image interpolation processing on the RAW data accumulated in the storage section 73, and converts the RAW data into YUV format data. The YUV data (YUV1, YUV2) of two images converted by the image processing section 86 are accumulated in the storage section 73. The codec section 87 performs encoding on the YUV data (YUV3) accumulated in the storage section 73, and converts the YUV data into JPEG format data. The JPEG data converted by the codec section 87 is stored in the storage section 73.

For example, as described in the embodiments 1 to 3, the detection section 74 extracts the feature amount and the feature point of the image by using, for example, an intensity signal (Y) of the YUV data accumulated in the storage section 73 as a pixel value. The feature point is a point having a relatively large feature amount, and the feature point may be a static thing excluding, for example, a running person and a running car. The image processing apparatus and the image processing method described in the embodiments 1 to 3 are applied as an apparatus or a method for obtaining the feature amount of image in the detection section 74. The detection section 74 calculates a motion vector between two images on the basis of the feature amount and the feature point extracted on the basis of, for example, the intensity signals (Y1, Y2) of the two images. The motion vector calculated by the detection section 74 is sent to the image synthesis processing section 75. The image synthesis processing section 75 determines and synthesizes portions in the two images on the basis of the motion vector sent from the detection section 74 and the YUV data (YUV1, YUV2) of the two images accumulated in the storage section 73. The YUV data (YUV3) synthesized by the image synthesis processing section 75 is stored in the storage section 73. As described above, the codec section 87 converts the YUV data (YUV3) synthesized by the image synthesis processing section 75 into JPEG data.

In accordance with the embodiment 4, since the amount of displacement between two images may be obtained in the detection section 74, by synthesizing the two images on the basis of the amount of displacement, an image which is blurred due to a camera shake or a long time exposure when capturing the image may be corrected. In addition, in the similar way as the embodiments 1 to 3, the feature amount of image may be speedily obtained. Furthermore, the feature amount of image may be obtained by using a small memory capacity. Therefore, the embodiment 4 is effective when performing image processing such as the camera shake correction processing in an electronic apparatus with limited resources such as a small-sized digital camera and a digital camera installed in a mobile phone.

The embodiment described above may be used in a feature point extraction used for deriving an amount of displacement (motion vector between picture planes) in image matching processing performed prior to image synthesis of super resolution processing. In this case, since the amount of calculation may be simplified, a shortening of calculation time, a reduction of circuit scale, a reduction of memory size, and the like are possible.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present invention have been described in detail, it should be understood that the various changes, substitutions, and alterations could be made hereto without departing from the spirit and scope of the invention.

What is claimed is:

1. An image processing method performed by a processor for processing a plurality of pixel values in an image data representing a two-dimensional image, the image processing method comprising:
    defining a block representing a part of the two-dimensional image corresponding to a predetermined number of pixels in rows and columns;
    obtaining an average of a gradient of pixel value on the basis of the pixel values of adjacent pixels in the block along each of at least one of rows and at least one of columns;
    generating a product of the average of the gradient pixel value along each of at least one of the rows and the average of the gradient pixel value along each of at least one of the columns;
    generating a double summation of the products of the gradient pixel values of each of the rows and the columns; and
    obtaining a feature amount of the block by performing a calculation between the double summation of the products and the product of the gradients comprising dividing the double summation of the products by the product of the gradients.

2. The image processing method according to claim 1, wherein the obtaining the average of the gradient of pixel value is performed by obtaining a difference between a pixel value located at one end in the block along each of at least one of rows and a pixel value outside and adjacently located at the other end in the block along each of at least one of rows as to the average of the gradient in the block along each of at least one of rows, and generating a difference between a pixel value at one end in the block along each of at least one of columns and a pixel value outside and adjacently located at the other end in the block along each of at least one of columns as to the average of the gradient in the block along each of at least one of columns.

3. The image processing method according to claim 1, wherein the obtaining the feature amount of the block is performed by obtaining a difference between a result of a bit search of the double summation of the products and a result of the bit search of the product as to the feature amount of the block.

4. The image processing method according to claim 1, wherein the obtaining the feature amount of the block is performed by subtracting a logarithm of the double summation of the products from a logarithm of the product of the gradients.

5. An image processor performed by a processor for processing a plurality of pixel values in an image data representing a two-dimensional image, the image processor comprising:
    an average gradient generator for
        defining a block representing a part of the two-dimensional image corresponding to a predetermined number of pixels in rows and columns, obtaining an average of a gradient of pixel value on the basis of the pixel values of adjacent pixels in the block along each of at least one of rows and at least one of columns, and
        generating a product of the average of the gradient pixel value along each of at least one of the rows and the average of the gradient pixel value along each of at least one of the columns;
    a gradient product generator for generating a double summation of the products of the gradient pixel values of each of the rows and the columns; and
    a feature amount generator for obtaining a feature amount of the block by performing a calculation between the double summation of the products and the product of the gradients comprising dividing the double summation of the products by the product of the gradients.

6. The image processor according to claim 5, wherein the average gradient generator includes a first accumulator for obtaining a first sum of a difference between a pixel value located at one end in the block along each of at least one of rows and a pixel value outside and adjacently located at the other end in the block along each of at least one of rows as to the average of the gradient in the block along each of at least one of rows, a second accumulator for obtaining a second sum of a difference between a pixel value at one end in the block along each of at least one of columns and a pixel value outside and adjacently located at the other end in the block along each of at least one of columns as to the average of the gradient in the block along each of at least one of columns, and a multiplier for obtaining a product of the first sum and the second sum.

7. The image processing system according to claim 5, wherein the feature amount generator includes a first bit searcher for performing a bit search as to the double summation of the products, a second bit searcher for performing a bit search as to the product, and a difference generator for generating a difference between an output result of the first and the second bit searcher.

8. A non-transitory computer-readable storage medium storing a program for controlling a processor for executing a process of an image processing for processing a plurality of pixel values representing a two-dimensional image, the process comprising:
    defining a block representing a part of the two-dimensional image corresponding to a predetermined number of pixels in rows and columns;
    obtaining an average of a gradient of pixel value on the basis of the pixel values of adjacent pixels in the block along each of at least one of rows and at least one of columns;
    generating a product of the average of the gradient pixel value along each of at least one of the rows and the average of the gradient pixel value along each of at least one of the columns;
    generating a double summation of the products of the gradient pixel values of each of the rows and the columns; and
    obtaining a feature amount of the block by performing a calculation between the double summation of the products and the product of the gradients comprising dividing the double summation of the products by the product of the gradients.

9. The non-transitory computer-readable storage medium according to claim 8, wherein the obtaining the average of the gradient of pixel value is performed by obtaining a difference between a pixel value located at one end in the block along each of at least one of rows and a pixel value outside and adjacently located at the other end in the block along each of at least one of rows as to the average of the gradient in the block along each of at least one of rows, and generating a difference between a pixel value at one end in the block along each of at least one of columns and a pixel value outside and adjacently located at the other end in the block along each of at least one of columns as to the average of the gradient in the block along each of at least one of columns.

10. The non-transitory computer-readable storage medium according to claim 8, wherein the obtaining the feature amount of the block is performed by obtaining a difference between a result of a bit search of the double summation of the products and a result of the bit search of the product as to the feature amount of the block.

11. The non-transitory computer-readable storage medium according to claim 8, wherein the obtaining the feature amount of the block is performed by subtracting a logarithm of the double summation of the products from a logarithm of the product of the gradients.

* * * * *